(12) United States Patent
Genderjahn et al.

(10) Patent No.: US 9,172,277 B2
(45) Date of Patent: Oct. 27, 2015

(54) ACTUATOR

(71) Applicant: ContiTech Vibration Control GmbH, Hannover (DE)

(72) Inventors: Robert Genderjahn, Hannover (DE); Peter Marienfeld, Marklohe (DE); Hans-Juergen Karkosch, Hemmingen (DE)

(73) Assignee: ContiTech Vibration Control GmbH, Hannover (DE)

( * ) Notice: Subject to any disclaimer, the term of this patent is extended or adjusted under 35 U.S.C. 154(b) by 296 days.

(21) Appl. No.: 13/854,870

(22) Filed: Apr. 1, 2013

(65) Prior Publication Data

US 2013/0234539 A1    Sep. 12, 2013

Related U.S. Application Data

(63) Continuation of application No. PCT/EP2011/061940, filed on Jul. 13, 2011.

(30) Foreign Application Priority Data

Oct. 1, 2010    (DE) .......................... 10 2010 037 922

(51) Int. Cl.
*H02K 33/00*    (2006.01)
*H02K 1/02*    (2006.01)
*F16K 31/08*    (2006.01)
*H01F 7/06*    (2006.01)
*H01F 7/122*    (2006.01)
*H02K 35/00*    (2006.01)
*H01J 7/16*    (2006.01)
*H01F 3/08*    (2006.01)

(52) U.S. Cl.
CPC ................ *H02K 1/02* (2013.01); *F16K 31/082* (2013.01); *H01F 7/066* (2013.01); *H01F 7/122* (2013.01); *H01J 7/16* (2013.01); *H02K 35/00* (2013.01); *H01F 3/08* (2013.01)

(58) Field of Classification Search
USPC ................... 310/34–36, 44, 15, 23–24, 13–14
See application file for complete search history.

(56) References Cited

U.S. PATENT DOCUMENTS 6,244,526 B1    6/2001    Schuldt et al.
6,380,832 B2    4/2002    Oyama et al.

(Continued)

FOREIGN PATENT DOCUMENTS

DE    696 10 009 T2    5/2001
DE    10 2006 058 073 A1    10/2007
EP    0 284 634 A1    10/1988

OTHER PUBLICATIONS

International Search Report dated Dec. 29, 2011 of international application PCT/EP2011/061940 on which this application is based.

*Primary Examiner* — Thanh Lam
(74) *Attorney, Agent, or Firm* — Walter Ottesen P.A.

(57) ABSTRACT

An actuator includes an electrically conductive coil defining a longitudinal axis (L) and having a plurality of winding turns. A magnet is spaced from the winding turns in radial direction. A first conductive element has a mid region covering the coil on a side thereof facing away from the magnet. A second conductive element has a mid region covering the magnet on a side thereof facing away from the winding turns of the coil. The first conductive element projects beyond the coil in axial direction and the second conductive element projects beyond the magnet also in axial direction. The first and second conductive elements have respective collar-shaped projections whereat the first and second conductive elements project beyond the coil and the magnet, respectively. At least one of the first and second conductive elements is made of soft-magnetic powder composite material.

19 Claims, 3 Drawing Sheets

(56) References Cited

U.S. PATENT DOCUMENTS

| | | | |
|---|---|---|---|
| 6,476,702 B1 * | 11/2002 | Hartwig et al. | 335/220 |
| 7,053,741 B2 | 5/2006 | Tojo et al. | |
| 7,354,027 B2 * | 4/2008 | Mennicken et al. | 251/64 |
| 2006/0006754 A1 * | 1/2006 | Calico | 310/156.43 |
| 2008/0100154 A1 * | 5/2008 | Imagawa et al. | 310/44 |

\* cited by examiner

Fig. 2 ically conductive coil, which has a longitudinal axis and a
ACTUATOR

CROSS REFERENCE TO RELATED APPLICATIONS

This application is a continuation application of international patent application PCT/EP2011/061940, filed Jul. 13, 2011, designating the United States and claiming priority from German application 10 2010 037 922.0, filed Oct. 1, 2010, and the entire content of both applications is incorporated herein by reference.

FIELD OF THE INVENTION

The invention relates to an actuator comprising an electrically conductive coil, which has a longitudinal axis and a plurality of turns, and comprising at least one magnet, which is arranged spaced apart from the turns of the coil in the radial direction with respect to the longitudinal axis L, wherein the coil is at least partially covered on a side remote from the magnet by a central region of a first conducting element, and the at least one magnet is at least partially covered on a side remote from the turns of the coil by a central region of a second conducting element, wherein the first conducting element protrudes beyond the coil, and the second conducting element protrudes beyond the at least one magnet, in the axial direction with respect to the longitudinal axis L, and said first and second conducting elements each have collar-like projections there.

BACKGROUND OF THE INVENTION

Such an actuator is known from U.S. Pat. No. 6,476,702, for example.

In the case of such actuators, the first conducting element and the second conducting element usually consist of a ferromagnetic material of high permeability. Such actuators contain an oscillatory mass-spring system, which is excited so as to produce oscillations when an alternating current is driven through the turns of the electrically conductive coil.

The at least one magnet has a magnetization with a magnetization direction which is ideally perpendicular to the longitudinal axis of the coil. If a current now flows through the coil, a Lorentz force acts in the direction of the longitudinal axis of the coil. As described in U.S. Pat. No. 6,476,702, the interaction of the magnetic lines of force emerging from the collar-like projections of the first conducting element and the second conducting element or the magnetization of the magnet, which advantageously likewise consists of a material of high permeability, results in a further force, which acts in the same direction as the described Lorentz force. Since the magnetic lines of force are conducted in specific directions by the first and second conducting elements, both component parts are in this case referred to as conducting elements.

In the case of an actuator of the generic type, either the coil with the first conducting element or the magnet with the second conducting element is mounted in a sprung manner, while the respective other assembly is mounted statically. If a current now flows through the coil, the abovementioned forces result in a shift in the spring-mounted assembly and therefore in a movement of the actuator. In this way, valves can be opened or closed, for example. If an alternating current flows through the coil instead of the direct current, the direction of the acting forces reverses along with the current flow direction. In this way, the spring-mounted assembly is caused to oscillate. By targeted selection of the amplitude, frequency and phase of the applied alternating current, the oscillation of the actuator can be controlled very precisely. In this way, for example, oscillations can be produced or an oscillation in phase opposition can be superimposed on already existing oscillations and these already existing oscillations can thus be compensated for.

One disadvantage is the fact that the excitation force that can be achieved with the actuator in accordance with the prior art is relatively low in relation to the physical volume required for this. In addition, the usable frequency range in which the actuator can be operated on alternating current is subject to restrictions. Firstly, the first natural frequency of the system, which is the lowest frequency at which the actuator can be operated, cannot be shifted to lower frequencies. Secondly, the working range in the higher-frequency range is limited owing to the low amount of coil installation space and the use of coils with a small wire diameter associated therewith.

It is known from the prior art to form the first and the second conducting elements of the actuator as a laminate stack comprising many thin layers of ferromagnetic laminations with high permeability in order to reduce losses as a result of ring currents which are produced around the magnetic lines of force. For this purpose, for example, electric steel laminations or iron laminations which are separated from one another by thin insulating layers are suitable. In this way, ring currents around the magnetic lines of force can only result in orders of magnitude of the thickness of these laminations. Although the losses are thus reduced and therefore the efficiency of the actuator can be increased, the achievable excitation forces are still very low in relation to the physical volume.

U.S. Pat. Nos. 6,244,526 and 7,053,741 have disclosed the use of an electromagnetic actuator as a fuel injection valve. However, high excitation forces are not required for this, with the result that the force required for switching a valve can be applied without any problems by an already described actuator. In addition, owing to the special configuration of the actuator in said documents, the radial extent of the actuator with respect to the longitudinal axis of the coil is markedly reduced. That is to say that the movable portion of the actuator is arranged below the statically mounted portion in both documents, with the result that the radial extent is naturally markedly reduced. However, the required volume is still relatively large, even when it now has a different shape than in the case of the first-described embodiment of an actuator. Such an arrangement is unsuitable for operation on alternating current, however.

In addition, the working principle of the actuators described in said documents is different. Both actuators manage without any magnets. The excitation force is only produced by the magnetic field produced by the coil and not, as is the case in this case, also by a current which is flowing in the magnetic field of the magnet and the Lorentz force caused hereby.

SUMMARY OF THE INVENTION

It is an object of the invention to provide an actuator of the kind described above such that, given a fixed physical volume, the excitation forces which can be achieved can be increased or, given a fixed excitation force, that physical volume can be markedly reduced.

The invention achieves the stated object with an actuator of the generic type wherein the first conducting element and/or the second conducting element consist(s) of a soft-magnetic powder composite material. Powder composite materials, so-called soft-magnetic composites (SMC), consist of a powder of a material which has a high permeability. The individual grains of powder are electrically insulated from one another by thin layers of synthetic resin, for example.

Surprisingly, it has been shown that, by virtue of the use of a soft-magnetic powder composite material as at least one of the two conducting elements, the extent of this conducting element, that is, the component part thickness, can be markedly reduced. In particular the central region of the first and/or second conducting element(s) can now be designed to be markedly thinner, with the result that space and installation space can be saved here. This can now be used to provide more coil turns or a greater wire cross section given the same turns number with the same external dimensions of the actuator. By virtue of both measures, the magnetic field and thus the achievable excitation force are markedly increased. The lower component part thickness of the first and/or second conducting element(s) can also be used to reduce the required physical volume given the same coil geometry and the same wire cross section and therefore the same excitation force, however.

In addition, by virtue of increasing the wire cross section, the working range of the actuator can be shifted towards higher frequencies.

The use of soft-magnetic powder composite materials, so-called soft-magnetic composites (SMC) also provides the advantage that production takes place in the pressing method, or during sintering. As a result, very high densities can be achieved and the manufacturing costs can be markedly reduced in comparison with the mechanical working of iron materials or the production of laminate stacks. In addition, owing to the fact that the soft-magnetic powder composite materials consist of a powder of a material with high permeability and the individual powder grains are electrically insulated from one another by a thin insulating layer, the magnetic properties of the first and/or second conducting element(s) are further improved and the magnetic losses are further reduced. In comparison with the advantages which are provided by the small component part extent and the low component part volume associated therewith, this is only a subordinate effect, however.

Advantageously, the first conducting element and/or the second conducting element has/have an extent of less than 3 mm, preferably less than 2 mm, in the central region of said conducting element(s) in the radial direction with respect to the longitudinal axis. In comparison with actuators from the prior art, the wall thickness of the respective conducting element in this region can therefore sometimes be more than halved. This results in additional installation space, which can either be used for measures which increase the excitation force or can be saved as installation space for the finished actuator.

Alternatively, it is also possible for the coils to be sheathed with plastic or the like, for example, without restrictions in respect of turns number and wire diameter needing to be accepted.

In a preferred exemplary embodiment of the present invention, the collar-like projections of the first conducting element have an extent (d) in the axial direction with respect to the longitudinal axis. The collar-like projections of the second conducting element have an extent D in the axial direction with respect to the longitudinal axis, wherein it has proven to be particularly advantageous if the ratio of extent d/D is between 0.6 and 0.8. An optimum magnetic rigidity is thus achieved. In addition, the actuator demonstrates a linear operational response as long as the maximum deflection of the spring-mounted assembly, that is, either the first conducting element with the coil or the magnet with the second conducting element, is less than ±d/2 along the longitudinal axis of the coil.

It has proven to be particularly advantageous if both the first conducting element and the second conducting element consist of a soft-magnetic powder composite material. As a result, the eddy currents and the magnetic losses associated therewith can be reduced in both conducting elements and the density can be increased, and therefore the achievable excitation force can possibly be increased. In addition, the required installation space can be reduced in the case of both conducting elements.

Preferably, the at least one magnet is arranged in the form of a ring around the coil. By virtue of a rotational symmetrical configuration of the actuator, the total lateral surface area of the coil can be used for the interaction with the at least one magnet, with the result that the excitation force achieved is also maximized in this regard. Preferably, given this configuration of the actuator, the second conducting element is arranged in the form of a ring around the at least one magnet and comprises a plurality of parts, in particular two half-shells.

The second conducting element which is arranged in the form of a ring around the at least one magnet can in this case complete a rotationally symmetrical configuration about the longitudinal axis of the coil. Thus, the force which is caused by the interaction of the magnetic lines of force emerging from the core with the magnet or the second conducting element is also used to the full extent around the coil and therefore maximized. In this configuration, the first conducting element is located in the coil and forms the core of the coil. It is preferably likewise formed rotationally symmetrically with respect to the longitudinal axis of the coil. The second conducting element is arranged on the outside of the actuator and forms the lateral surface of the actuator.

As an alternative to this configuration, the coil can also be arranged in the form of a ring around the at least one magnet. In a particularly preferred configuration of the present invention, the first conducting element is then arranged in the form of a ring around the coil and comprises a plurality of parts, in particular two half-shells. In this configuration, the second conducting element together with the magnet forms the core of the coil and of the actuator. The first conducting element, as the outermost of the component parts described here, forms the lateral surface of the actuator.

In both embodiments and arrangements, the actuator functions and the advantages of the present invention have full effect.

Owing to the fact that the lateral surface is produced in a plurality of parts, in particular comprising two identical or symmetrical half-shells consisting of the powder composite material, the manufacture is simplified, manufacturing costs are reduced, and installation is facilitated. This provides the possibility of clamping the coil or the at least one magnet between the two half-shells, with the result that a secure hold in the system is realized. Thus, additional complex adhesive bonding or the like is not required, as a result of which the production is further simplified.

Advantageously, the at least one magnet has a greater extent than the coil in the axial direction with respect to the longitudinal axis. It has proven to be advantageous if the at least one magnet protrudes beyond the coil by 2 mm to 5 mm, preferably by 3 to 5 mm, particularly preferably by 4 mm, in the axial direction with respect to the longitudinal axis. This applies advantageously in each case to both sides of the coil in the longitudinal direction.

In this case, the collar-like projections of the first conducting element protrude beyond the at least one magnet by 1 mm to 3 mm, preferably by 2 mm in the axial direction. This also preferably applies to both sides in the longitudinal direction of the coil. A linear actuator response within the mentioned deflection range of the spring-mounted component part group can be ensured with the mentioned dimensions.

It is also advantageous if the first conducting element and/or the second conducting element has/have at least one projection, which is formed integrally therewith, in the axial direction with respect to the longitudinal axis L. By virtue of such projections, which are formed as a subregion of the conducting element or conducting elements, it is possible to dispense with further components which would otherwise need to be produced separately or purchased for this purpose and fitted in separate steps. These separate component parts can be, for example, spacer elements, separating elements or the like, which are conventionally provided between the conducting element and, for example, the housing or spring in order to adjust a defined distance between the conducting element and, for example, the housing or the spring in order, for example, to prevent magnetic return from the conducting element via the housing material or to ensure a desired oscillation path of the spring. Likewise, these separate component parts can be clamping elements, for example, which are conventionally provided on the conducting element in order to support a spring, for example, which is intended to be clamped, for example, by means of a further clamping element on the conducting element in the axial direction with respect to the longitudinal axis L. According to the invention, it is possible to dispense with these separate component parts since the projections formed integrally with the conducting element or the conducting elements are configured in such a way that the springs bearing against said projections are clamped in optimum fashion and the required free paths or oscillation paths of the moving masses of the actuator can be realized.

In this case, the first or second conducting element can be produced, for example formed (sintered) by SMC powder, in such a way that the required contour of the conducting element or conducting elements including the projection or projections is formed in one production step. For this purpose, the production form for the conducting elements only needs to be correspondingly designed once, for example. Numerous costs for separate parts and installation steps can correspondingly be saved. If on both sides of the actuator in each case one spacer element is replaced by projections on each side of the second conducting element and likewise in each case one spacer element on each side of the first conducting element, in total four separate component parts and the corresponding installation steps can be dispensed with.

It is particularly advantageous here if the projection is designed so as to be set back from the end face of the first and/or second conducting element(s) in the radial direction with respect to the longitudinal axis L. In this context, set back is understood to mean that the projection or projections are formed so as to be spaced apart from the air gap that is formed between the coil and the magnet or between the first and second conducting elements in the radial direction with respect to the longitudinal axis L. In other words, the projections do not reach into the region of the pole faces of the conducting elements. This means that the projections which have the same soft-magnetic powder composite material as the conducting element or conducting elements do not contribute or contribute as little as possible to the magnetic return flow and thus the system response is not influenced or is influenced as little as possible by the integral formation of the projection or projections.

Preferably, the coil and the first conducting element or the at least one magnet and the second conducting element are mounted in a sprung manner on at least one multiple-arm spring washer. With this configuration, disadvantages of the leaf springs used in the prior art in respect of rigidity, linearity and fatigue strength are compensated for. Actuators from the prior art also have a very high degree of magnetic rigidity along the longitudinal axis of the coil. In order to compensate for this magnetic rigidity, a very high degree of spring rigidity is required. This is disadvantageous for the fatigue strength properties and the lower resonant frequency of the system. By virtue of the magnetic rigidity and the spring rigidity being superimposed, the total rigidity of the system is provided. In order that the operational response of the actuator is linear within the maximum deflection, the total actuator rigidity must also be linear.

A multiple-arm spring washer enables a linear response, a high fatigue strength and an ideal strain distribution within the spring. Thus, the transverse rigidity occurring perpendicular to the longitudinal axis of the coil, which transverse rigidity is caused by the magnetic attraction forces, can be absorbed, and the magnetic rigidity along the longitudinal axis can be compensated for. In addition, in the case of a multiple-arm spring washer, a change in the thickness of the washer makes it possible to realize the spring rigidity for the relevant deflection range easily, quickly and reliably. In this case, fatigue strength properties are not disadvantageously influenced. Thus, the modularity of the entire system in respect of the change in the first natural frequency can also be realized by an uncomplicated replacement of the spring. An optimum spring material is also nonmagnetic and corrosion-protected.

By virtue of the various measures which are complementary to one another and cause synergy effects, the total rigidity of the system can be altered, the first natural frequency can be shifted to small frequencies and also the maximum achievable excitation force can be increased. Owing to the selection of the extension ratio d/D, for example, it is firstly possible to reduce the magnetic rigidity. Secondly, it is thus possible, however, to also reduce the required rigidity for the leaf springs used, as a result of which the first natural frequency of the system is shifted towards lower frequencies.

An actuator in accordance with one exemplary embodiment of the present invention therefore results in an increase in the force density, that is, a higher excitation force in relation to the required physical volume. It is possible, given the same physical volume, to equip the coil with a greater number of turns, as a result of which the excitation force achieved can be increased. As an alternative or in addition to this, is also possible for a larger wire cross section to be selected, as a result of which the frequency range in which the actuator can be operated can be shifted towards high frequencies. The maximum permissible coil current is increased by the larger wire cross section.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
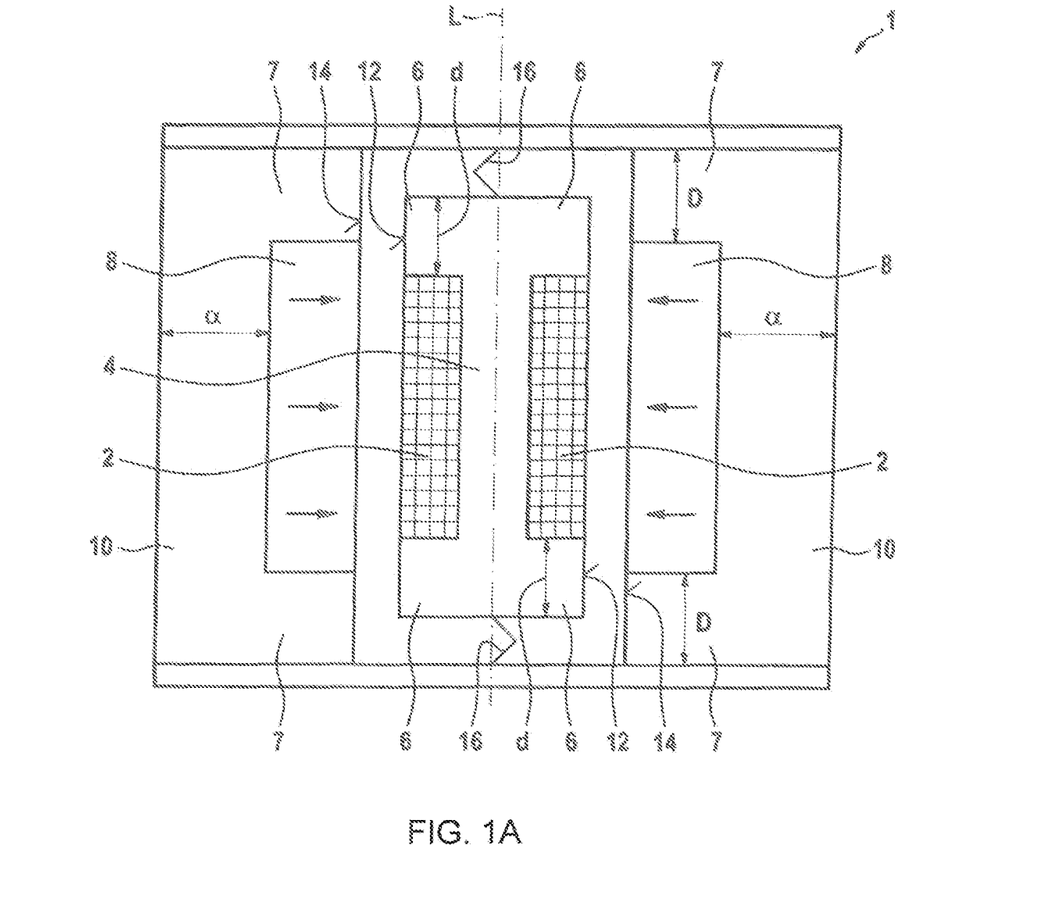
FIG. 1A is a schematic cross section through an actuator in accordance with a first embodiment of the invention.

FIG. 1A shows a schematic cross section through an actuator 1 in accordance with a first embodiment of the invention. The actuator 1 comprises a coil 2, which is wound around a first conducting element 4 and has a longitudinal axis L. The first conducting element 4 extends beyond the coil 2 in the axial direction with respect to the longitudinal axis L on both ends and has collar-like projections 6 there. These collar-like projections 6 have an extent (d) in the axial direction with respect to the longitudinal axis L.

In the embodiment shown in FIG. 1A, the coil 2 with the first conducting element 4 located therein is arranged between two magnets 8. These magnets have a magnetization which is indicated by small arrows in FIG. 1A. The magnets 8 are ideally homogeneously magnetized and have a magnetization direction which, as shown in FIG. 1A, is optimally perpendicular to the longitudinal axis L. In a particularly preferred embodiment, the magnet 8 is arranged in the form of an annulus around the coil 2 and the first conducting element 4 located therein.

Each magnet 8 is covered on the side remote from the coil 2 and on two ends lying in the axial direction with respect to the longitudinal axis L by a second conducting element 10. In the embodiment shown in FIG. 1A, this overlap on the ends is complete, which is not necessary for the invention, however.

The second conducting element 10 extends beyond the magnet 8 in the axial direction with respect to the longitudinal axis L in the form of collar-like projections 7 and has an extent D in this region. Advantageously, the ratio of the extent (d) to the extent D is less than 1, in particular between 0.6 and 0.8. This results in optimum overlaps of the mutually opposite end faces 12 of the first conducting element 4 or the collar-like projections 6 and the end faces 14 of the second conducting element 10 or the collar-like projections 7.

If a current flows through the coil 2, different forces are caused which all act in the same direction. Firstly, the current flow in the magnetic field of the magnets 8 results in a Lorentz force, which acts on the coil 2 in FIG. 1A upwards or downwards, that is, along the longitudinal axis L of the coil. In addition, a magnetic field is induced in the first conducting element 4 and in the collar-like projections 6 by the current through the coil 2. Owing to the interaction of this magnetic field with the second conducting element 10 or the magnet 8, further forces are caused which act in the same direction as the Lorentz force.

In the embodiment shown in FIG. 1A, the coil 2 and the first conducting element 4 located therein are spring-mounted via springs 16. Alternatively, the magnet 8 with the second conducting element 10 can also be spring-mounted instead of the coil 2 with the first conducting element 4.

Owing to the forces induced by the current flow through the coil 2, in the embodiment shown in FIG. 1A, the coil 2 and the first conducting element 4 are shifted along the longitudinal axis L.

According to the invention, the first conducting element 4 and/or the second conducting element 10 consist(s) of a soft-magnetic powder composite material. It is thus possible to reduce the extent ($\alpha$) of each conducting element (4, 10) in the radial direction with respect to the longitudinal axis L. The extent ($\alpha$) of the second conducting element 10, which is illustrated in FIG. 1A, is, in particular, less than 3 mm, particularly preferably less than 2 mm. In this way, the installation space required for the actuator 1 can be markedly reduced. Owing to the low installation space requirement for a first conducting element 4 consisting of a soft-magnetic powder composite material, the installation space required for the actuator 1 is also reduced.

However, if the installation space is available, the magnet 8, which is surrounded by the second conducting element 10, can be arranged further removed from the coil 2 and the first conducting element 4 located therein in the radial direction with respect to the longitudinal axis L owing to the very small extent ($\alpha$) of the second conducting element 10. As a result, the installation space available for the coil 2 is increased, with the result that a wire with a larger cross section or a higher turns number or even a combination of the two can be used, for example. As a result, the frequency range in which the actuator can be operated is increased and the maximum achievable excitation force is increased.

As an alternative to the described embodiment of the invention, it is also possible for the at least one magnet 8 to be arranged on the inside and the coil 2 on the outside in the actuator. In this case, the at least one magnet 8 is located in the interior of the coil 2, but remains spaced apart from the turns of the coil 2 in the radial direction with respect to the longitudinal axis L of the coil. That side of the magnet 8 which is remote from the turns and is at least partially covered by the second conducting element 10 is then the side which is spaced further apart from the turns of the coil 2, with the result that the second conducting element 10 is located in the center of the rotationally symmetrical actuator. It has proved to be particularly advantageous if the size ratios described for the embodiment shown in FIG. 1A apply in this case, too.

Figure 1B:
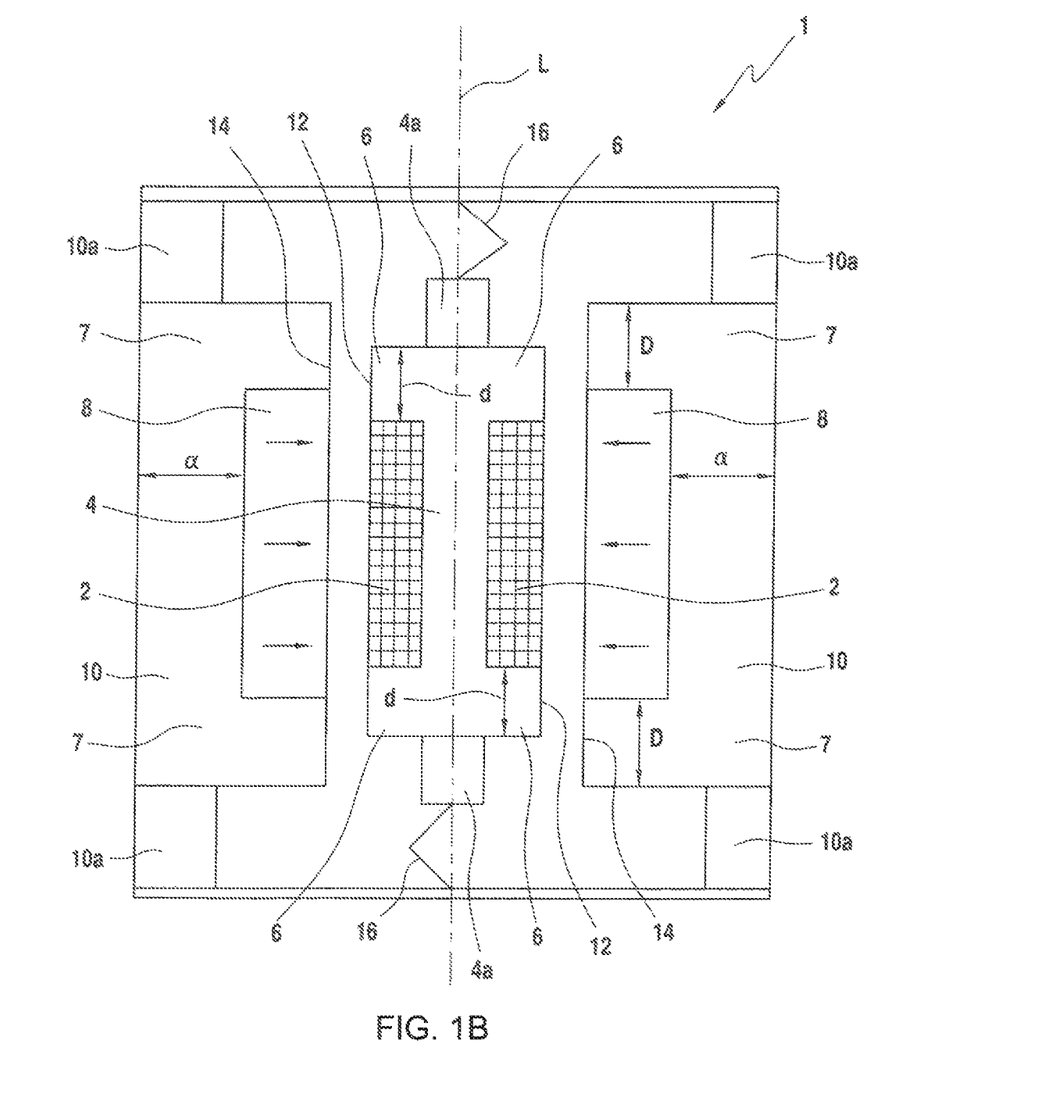
FIG. 1B is a schematic cross section through an actuator in accordance with a second embodiment of the invention; and, FIG. 2 is a plan view of a spring washer for use in an actuator in accordance with a further embodiment of the invention.

FIG. 1B shows a schematic cross section through an actuator 1 in accordance with a second embodiment of the invention. The elements in FIG. 1A correspond to those in FIG. 1B. In addition, the schematic in FIG. 1B has further elements. Thus, in the embodiment shown in FIG. 1B, components 4a are provided between the first conducting element 4 and the respective springs 16 in the axial direction with respect to the longitudinal axis L. This component 4a spaces apart one end of the spring 16 from the corresponding collar-like projection 6 of the first conducting element 4 by a defined distance in the axial direction with respect to the longitudinal axis L and can therefore be referred to as a spacer element 4a or separating element 4a.

In addition, the embodiment shown in FIG. 1B has respective components 10a between the second conducting element 10 and an outer housing element in the axial direction with respect to the longitudinal axis L. This component 10a effects a defined distance between the second conducting element 10 and the housing element in the axial direction with respect to the longitudinal axis L, with the result that it can likewise be referred to as a spacer element 10a or separating element 10a.

By virtue of the dimensions given to the spacer elements (4a, 10a) in the axial direction with respect to the longitudinal axis L, the position of the housing element and the spring 16 relative to the first conducting element 4 and to the second conducting element 10 can be predetermined.

Conventionally, such spacer elements (4a, 10a) are formed as separate component parts. This requires corresponding handling steps during fitting of the actuator 1 in order to provide the in total four spacer elements (4a, 10a) on both ends of the first and second conducting elements (4, 10), for example in the embodiment of the actuator 1 shown in FIG. 1B, before the two springs 16 can be fitted on the conducting elements. These spacer elements (4a, 10a) are formed in the radial direction with respect to the longitudinal axis L in such a way that they have as great a distance from the corresponding ones of the end faces (12, 14) of the two conducting elements (4, 10) as possible, in order not to influence, or to influence as little as possible, the magnetic flux and thus the system response of the actuator 1.

According to the invention, it is possible to dispense with these spacer elements (4a, 10a) since the first conducting element 4 or second conducting element 10 and the two spacer elements 4a and 10a, respectively, adjoining the conducting elements are formed integrally. In other words, the first conducting element 4 and the second conducting element 10 each have projections (4a, 10a), in the axial direction with respect to the longitudinal axis L, which projections are dimensioned in such a way that they replace the spacer elements (4a, 10a). Thus, the projections (4a, 10a) of the first and second conducting elements (4, 10) are configured in such a way that they enable a defined oscillation path without influencing the magnetic flux between the conducting elements (4, 10), the coil 2 and the magnet 8, and enable optimum clamping of the spring 16.

Figure 2:
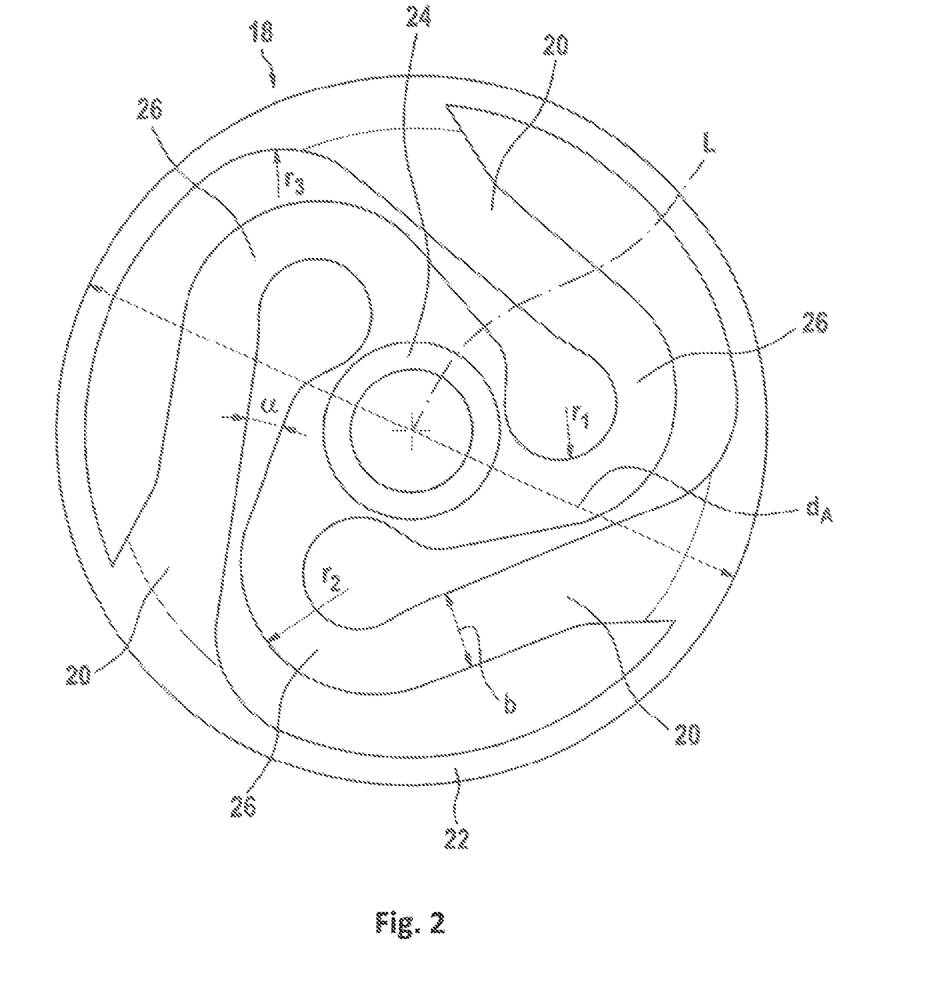

FIG. 2 shows a plan view of a spring washer 18 which can be used in an actuator. Such a multiple-arm spring washer 18 is suitable for spring-mounting, for example, the coil 2 and the first conducting element 4. The longitudinal axis L of the coil 2 runs out of the plane of the drawing in the exemplary embodiment shown in FIG. 2. Such a spring washer 18 is capable of absorbing the transverse rigidities occurring in the radial direction with respect to the longitudinal axis L, which transverse rigidities are caused by the magnetic attraction forces. In particular owing to the interaction between the coil 2, through which a current may be flowing, the first conducting element 4 located therein and the magnet 8, magnetic attraction forces occur which add up to zero only in the case where the coil 2 is arranged precisely centrally between the magnets 8. Since this is virtually never completely achievable, however, effective magnetic forces are always present in an actuator 1 which can be absorbed by a spring washer 18, as is shown in FIG. 2.

A spring washer 18 is also capable of compensating for the magnetic rigidity in the axial direction with respect to the longitudinal axis L.

The design of a spring washer 18 shown in FIG. 2 is particularly advantageous since it makes it possible to change the spring rigidity by virtue of the spring thickness alone, that is, the expansion of the spring washer 18 perpendicular to the plane of the drawing, and to match the spring rigidity to the particular conditions of the actuator 1. In this case, the fatigue strength properties of the spring are not disadvantageously influenced. If, in the case of a given actuator 1, the first natural frequency needs to be changed, this can be realized easily by an uncomplicated replacement of the spring, which is easy to implement, wherein a spring washer 18 of a first thickness is replaced by a spring washer 18 of a second thickness, which can be greater than or less than the first thickness.

The spring washer 18 shown in plan view in FIG. 2 has three spring arms 20, which are arranged at a distance of 120° on an outer rim 22 of the spring washer 18. The spring arms 20 run from the outer rim 22 of the spring washer 18 to a central washer 24, on which the component part to be mounted is mounted. In the embodiment shown in FIG. 2, the spring arms 20 in this case first run in the clockwise direction past the central washer 24 in order to then change direction at a turning point 26 and turn towards the central washer 24. The spring arms 20 can naturally also first run in the counterclockwise direction, with the spring washer 18 then having a mirror-inverted configuration.

The piercing point of the longitudinal axis L of the coil 2 forms the center point of the spring washer 18. The advantage with the design shown in FIG. 2 consists in that the design can be scaled easily for larger and smaller actuators 1. In this case, the scaling variable to which all other dimensions are related is the outer diameter $d_A$ of the spring washer 18. The dimensions mentioned below are always cited as units of this outer diameter $d_A$. It has proven to be particularly advantageous if the following dimensions and distances are adhered to. An inner radius $r_1$ of the turning point 26 is advantageously 0.08 times the outer diameter $d_A$. The outer radius $r_2$ of the turning point 26 is advantageously 0.19 times the outer diameter $d_A$. The transition radius $r_3$ of the curvature with which the spring arm 20 makes the transition to the outer rim 22 of the spring washer 18 is advantageously 0.16 times the outer diameter $d_A$.

Depending on the angle through which the spring washer 18 is rotated about the center point or the longitudinal axis L of the coil 2, the position of the center points of said curvatures from which the radii $r_1$, $r_2$ and $r_3$ start is different in each case. The relative position of the center points with respect to one another naturally remains the same, however. Given a specific angle position, three center points can advantageously be described by the following dimensions. The center point of an inner curvature of a turning point 26 of a first spring arm 20, in a plan view, is shifted towards the right through 0.16 outer diameter $d_A$ and downwards through 0.14 outer diameter $d_A$. At the same time, the center point of an outer radius $r_2$ of a second spring arm 20 is shifted towards the left through 0.18 outer diameter $d_A$ and downwards through 0.04 outer diameter $d_A$. The center point of the curvature with the transition radius $r_3$ of the third spring arm 20 is at the same time shifted towards the left through 0.11 outer diameter $d_A$ and upwards through 0.28 outer diameter $d_A$. In this way, the three center points are clearly defined relative to one another.

Each spring arm 20 advantageously has a linear region of constant width (b) between the turning point 26 and the outer rim 22 of the spring washer 18. This width (b) is advantageously 0.11 outer diameter $d_A$. The length of the straight region of the spring arm 20 is 0.43 outer diameter $d_A$ on the inner side, that is, on the side of the spring arm 20 which faces the central washer 24. The angle (α) between the straight region of a first spring arm 20 and the adjacent spring arm 20 is advantageously 11.9°. The spring thickness, that is, the expansion of the spring washer 18 in the axial direction with respect to the longitudinal direction L is advantageously between 0.4 mm and 0.7 mm.

It is understood that the foregoing description is that of the preferred embodiments of the invention and that various changes and modifications may be made thereto without departing from the spirit and scope of the invention as defined in the appended claims.

LIST OF REFERENCE SYMBOLS

L Longitudinal axis
d extent
D Extent
$d_A$ Outer diameter
$r_1$ Inner radius
$r_2$ Outer radius
$r_3$ Transition radius
b Width
α Angle
1 Actuator
2 Coil
4 First conducting element
4a Spacer element or projection of first conducting element 6 Collar-like projection
7 Collar-like projection
8 Magnet
10 Second conducting element
10a Spacer element or projection of second conducting element
12 End face
14 End face
16 Spring
18 Spring washer
20 Spring arm
22 Outer rim
24 Central washer
26 Turning point

What is claimed is:

1. An actuator comprising:
an electrically conductive coil defining a longitudinal axis (L) and having a plurality of winding turns;
a magnet spaced from said winding turns in radial direction with reference to said longitudinal axis (L);
said coil having a side facing away from said magnet;
a first conductive element having a mid region at least partially covering said coil on said side facing away from said magnet;
said magnet having a side facing away from said winding turns of said coil;
a second conductive element having a mid region at least partially covering said magnet on said side thereof facing away from said winding turns of said coil;
said first conductive element projecting beyond said coil in axial direction with reference to said longitudinal axis (L);
said second conductive element projecting beyond said magnet in axial direction with reference to said longitudinal axis (L);
said first and second conductive elements having respective collar-shaped projections whereat said first and second conductive elements project beyond said coil and said magnet, respectively; and,
at least one of said first and second conductive elements being made of soft-magnetic powder composite material.

2. The actuator of claim 1, wherein at least one of said first and second conductive elements at the mid region thereof exhibit an expansion ($\alpha$) in radial direction with reference to said longitudinal axis; and, said expansion ($\alpha$) is less than three mm.

3. The actuator of claim 1, wherein at least one of said first and second conductive elements at the mid region thereof exhibit an expansion ($\alpha$) in radial direction with reference to said longitudinal axis; and, said expansion ($\alpha$) is less than two mm.

4. The actuator of claim 1, wherein said collar-shaped projection of said first conductive element exhibits an expansion (d) in axial direction with respect to said longitudinal axis (L); said collar-shaped projection of said second conductive element exhibits an expansion (D) in axial direction with reference to said longitudinal axis (L); and, an expansion ratio d/D lies between 0.6 and 0.8.

5. The actuator of claim 1, wherein said magnet is configured as an annulus arranged around said coil.

6. The actuator of claim 5, wherein said second conductive element is configured as an annulus arranged around said magnet and comprises a plurality of parts.

7. The actuator of claim 6, wherein said plurality of parts comprises two half shells.

8. The actuator of claim 1, wherein said coil is configured to be annular and arranged around said magnet.

9. The actuator of claim 8, wherein said first conductive element is configured to be annular and arranged around said coil and said first conductive element comprises a plurality of parts.

10. The actuator of claim 9, wherein said plurality of parts comprises two half shells.

11. The actuator of claim 1, wherein said magnet exhibits a greater expansion in axial direction with reference to said longitudinal axis (L) than said coil and projects beyond said coil by 2 to 5 mm.

12. The actuator of claim 11, wherein said magnet exhibits a greater expansion in axial direction with reference to said longitudinal axis (L) than said coil and projects beyond said coil by 3 to 5 mm.

13. The actuator of claim 11, wherein said magnet projects beyond said coil by 4 mm.

14. The actuator of claim 1, wherein the collar-shaped projections of said first conductive element project beyond said magnet in axial direction with reference to said longitudinal axis (L) by 1 to 3 mm.

15. The actuator of claim 1, wherein the collar-shaped projections of said first conductive element project beyond said magnet in axial direction with reference to said longitudinal axis (L) by 2 mm.

16. The actuator of claim 1, wherein at least one of said first conductive element and said second conductive element has at least one projection which is configured to be a single piece therewith.

17. The actuator of claim 16, wherein said projection is recessed in radial direction with respect to said longitudinal axis (L) relative to the end face of at least one of the end faces of at least one of said first and second conductive elements.

18. The actuator of claim 1, further comprising at least one multiarm disc spring; and, said coil and said first conductive element or said magnet and said second conductive element are resiliently supported on said multiarm disc spring.

19. An actuator comprising:
an electrically conductive coil defining a longitudinal axis (L) and having a plurality of winding turns;
a magnet spaced from said winding turns in radial direction with reference to said longitudinal axis (L);
said coil having a side facing away from said magnet;
a first conductive element having a mid region at least partially covering said coil on said side facing away from said magnet;
said magnet having a side facing away from said winding turns of said coil;
a second conductive element having a mid region at least partially covering said magnet on said side thereof facing away from said winding turns of said coil;
said first conductive element projecting beyond said coil in axial direction with reference to said longitudinal axis (L);
said second conductive element projecting beyond said magnet in axial direction with reference to said longitudinal axis (L);
said first and second conductive elements having respective collar-shaped projections whereat said first and second conductive elements project beyond said coil and said magnet, respectively;
at least one of said first and second conductive elements being made of soft-magnetic powder composite material;
said coil and said first conductive element conjointly defining a first unit having first and second longitudinal ends;

said magnet and said second conductive element conjointly defining a second unit having first and second longitudinal ends; and, at least one multiarm disc spring configured to resiliently support said first unit or said second unit in the direction of said longitudinal axis at one of the first or second longitudinal ends thereof.

* * * * *